July 23, 1940.                A. RONNING                 2,208,600
                        VEHICLE STEERING DEVICE
                      Original Filed July 15, 1938
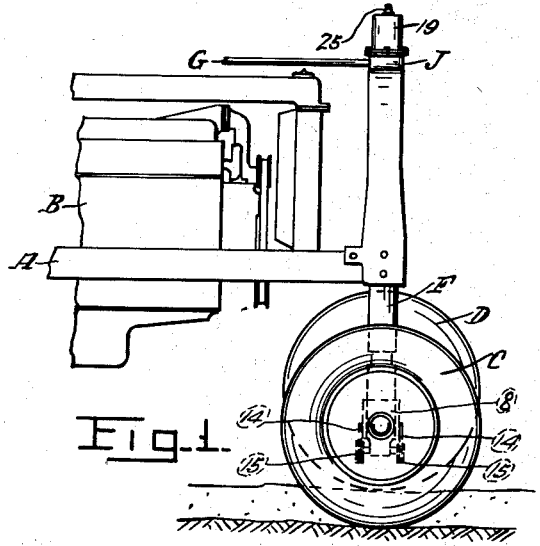
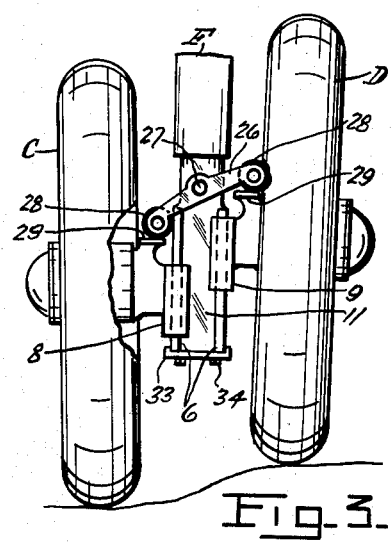
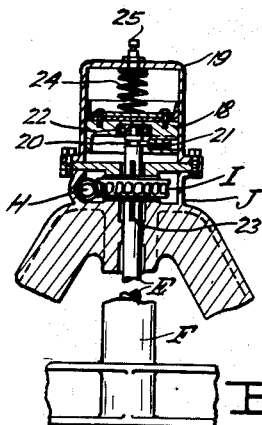
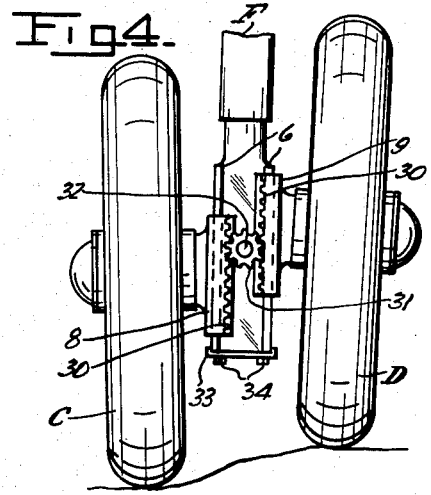
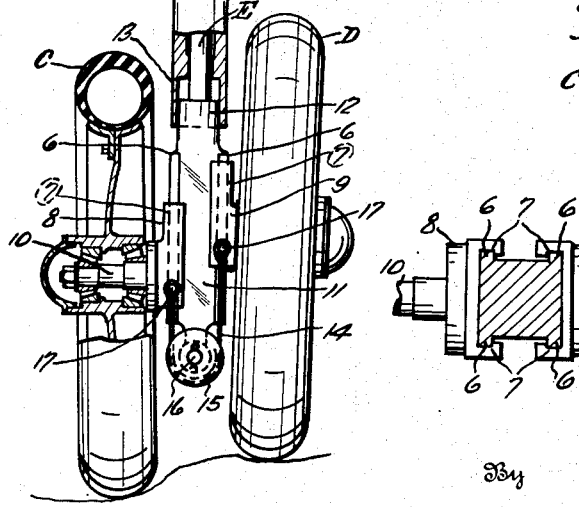
Inventor
ADOLPH RONNING
By Carlsen & Hagle
Attorney Patented July 23, 1940

2,208,600

UNITED STATES PATENT OFFICE 2,208,600

VEHICLE STEERING DEVICE

Adolph Ronning, Minneapolis, Minn.

Original application July 15, 1938, Serial No. 219,369. Divided and this application November 28, 1938, Serial No. 242,726

15 Claims. (Cl. 280—87)

This invention relates generally to improvements in steering trucks for vehicles, and more particularly to the type of truck or steering assembly used on tractors of the row crop type.

The conventional assembly of the steerable front ground wheels of such tractors includes a vertically journaled steering post supported at the front of the tractor and oscillated about a vertical axis by means of a rearwardly disposed steering wheel connected to the upper end of said post by a worm and worm gear. This oscillation of the steering post causes steering movement of the front wheels which are journaled upon an axle secured rigidly and transversely to the lower end of the post. These wheels are usually mounted in closely spaced relation immediately alongside the steering post and, due to their rigid connection to the post, an undesirable action is set up wherein, when either wheel strikes a rise of ground, the other is elevated from the ground causing side hill slippage and hard steering. Furthermore, this action has a tendency to raise the frontal end of the tractor and puts an uneven strain upon the front axle and steering post, as will be readily apparent.

Having these facts in mind it is the primary object of my invention to provide means whereby the steerable front wheels of such assemblies may be arranged and mounted for differential vertical movements so that as each is elevated by meeting a rise of ground the other is lowered by an equal amount, thus maintaining an even footing and causing equal distribution of the vehicle weight on both wheels at all times.

Another object is to provide a differential front wheel support of this kind in which the operating parts thereof are so located that they will not in any way hinder the normal steering movements of the wheels and will permit the wheels to be oscillated to very sharp angles when making a sharp turn with the vehicle.

Another object is to provide a wheel assembly of the character described in which the members actually carrying the wheels are vertically slidable upon the steering member to move therewith in steering operations, and with means connecting the said wheel supporting members for translating an upward movement of either to a corresponding downward movement of the other as required for maintaining constant ground engagement of the wheels.

A further object is to provide a novel and effective mounting for said wheel supporting members wherein tongue and groove assembly is used between these members and the steerable member, thus maintaining proper engagement of the parts while permitting free vertical movements.

Still a further object is to provide an assembly of this kind in which the steerable member is vertically slidable with respect to the vehicle frame and with means for cushioning the upward movement of this member to thereby absorb road shocks transmitted through the wheels to said member.

These and other more detailed and specific objects will be disclosed in the course of the following specification, reference being had to the accompanying drawing, in which:

Fig. 1 is a side elevation of the frontal portion of a conventional row crop tractor with my improved front wheel mounting thereon, the far wheel being shown as running at a higher elevation than the near wheel.

Fig. 2 is an enlarged, fragmentary front end view of the wheel mounting of Fig. 1, parts of one wheel and the upper and lower portions of the steering assembly being shown in vertical cross section.

Fig. 3 is a frontal elevation of a modified form of wheel mounting.

Fig. 4 is a similar view but showing still another modification.

Fig. 5 is an enlarged horizontal cross section through the lower portion of the steerable member, showing the tongue and groove connection of the wheel supporting members therewith.

This application is a division of my co-pending parent application Serial Number 219,369, filed July 15, 1938, and attention is invited to this prior application for comparative purposes.

For sake of exemplification my invention is shown as applied to a conventional row crop type of tractor but it is understood that the novel features constituting the essence of the invention may be applied to other types of vehicle as well.

The tractor comprises a main frame A supported at the rear by traction wheels (not shown, but driven by power unit B) and at the front by closely spaced front ground wheels C and D. These wheels C and D are ordinarily mounted upon a short axle (not shown) rigidly secured to the lower extremity of the vertically axised steering post or steerable member E, and this post is received within a substantially tubular housing F rigidly supported vertically at the front of the tractor. It is noted that this housing F terminates at its lower end some distance above the axis of rotation of the wheels C and D whereby any parts mounted below said housing (as will hereinafter be described) will not interfere in any way with rotation of the steering post about its vertical axis for steering purposes. Such rotation or oscillation of the steering post E is carried out by means of a rearwardly disposed steering wheel (not shown) connected to a steering shaft G and which carries a worm H meshing with a worm gear I mounted on the steering post and enclosed within a housing J mounted atop the housing F.

In accordance with my invention the lower end of the steering post E is provided with vertical, parallel corner tongues or ribs 6, and these are slidably engaged in the grooves 7 of a pair of guide blocks or bearing members 8 and 9 disposed at opposite sides of the post. These members 8 and 9 carry the oppositely and laterally extended spindles 10 upon which the hubs of the wheels C and D are actually journaled, and the arrangement of the grooves 7, opening inwardly toward the tongues 6 at each side, serves to retain the members in place while still permitting free vertical movement of the members and the wheels carried thereby.

In more detail it will be noted that the lower portion of the steering post E is formed with, or rigidly connected to, an extension element 11 which is rounded at its upper end 12 to rotatably and slidably fit a tubular lower end portion 13 of the housing F, while the lower end of said element is faced off to square or rectangular cross section with the tongues 6 extended along the vertical corners. As shown in Figs. 1 and 2, the bearing members are differentially connected by cables 14 or similar flexible elements (one used at both front and rear of the members) which are trained over pulleys 15 journaled to the lower end of the extension element 11 upon a horizontal axis 16. The ends of the cables 14 are rigidly anchored at their ends at 17 to the members 8 and 9.

The foregoing arrangement is obviously such that as either wheel C or D meets a rise of ground it may move upwardly with respect to the tractor, and the cables 14, by the resulting pull thereon, will translate a corresponding downward movement to the other wheel maintaining even ground contact of both wheels. This action takes place without disturbing the equilibrium of the the tractor and without causing uneven stresses on the steering assembly, as will be clearly evident. Also the differential movements of the wheels does not in any way interfere with the steering movements thereof, and it will be noted that sufficient clearance is provided at all points so that the wheels may be turned to very sharp angles to either side as required in making sharp turns with the tractor.

As shown in Figs. 1 and 2, the steering post E is vertically slidable in its housing member F, and at its upper end is rotatably connected to a piston or head member 18 which in turn is slidably mounted in an inverted cup-shaped or cylindrical housing cap 19 secured atop the housing J. The upper end of the post is peripherally grooved at 20 to rotatably engage a retaining screw 21 in said piston 18 for anchoring the parts together, and a ball thrust bearing 22 is provided to permit free turning movement of the post. The steering worm gear I is slidably keyed at 23 on the steering post and as a result of this construction the post may slide vertically and axially in the housing and through the worm gear without interference with its steering movements, as will be quite evident. This sliding movement is limited in an upward direction by the movement of the piston 18 upwardly in the housing cap 19 against the tension of an expansion coil spring 24 braced between said piston and the closed upper end of the cap. This spring 24 will thus serve to resiliently and yieldably thrust the steering post downwardly and will accordingly absorb the vertical shocks transmitted to the post by travel of the wheels C and D over rough ground. In lieu of the spring, or in addition thereto, hydraulic or pneumatic cushioning may be employed by admitting a fluid under pressure to the cap 19 through the connection 25.

The assembly shown in Fig. 3 is quite similar to that previously described but in lieu of the cable connections for reversely or differentially actuating the bearing members 8 and 9 I instead employ lever members 26 (at both front and rear) which are fulcrumed at 27 intermediate their ends to the steering post. At their ends these lever members 26 carry anti-friction rollers 28 which bear upon shoulders 29 formed on the bearing members 8 and 9 in such manner that, as either bearing member moves upwardly the movement will be reversely translated to the other bearing member and it will be urged downwardly by an equal amount. The even ground engagement of the wheels C and D will thus be maintained.

The assembly shown in Fig. 4 is still another modification of the differential connecting means and in this case the bearing members 8 and 9 are provided with toothed racks 30 along their front and rear edges and pinions 31 (both front and rear) are journaled at 32 upon the steering post for meshing engagement with the racks of the respective bearing members. These gear connections of course will also reversely translate movement between the bearing members for the purposes set forth. In both Figs. 3 and 4 the steering post, or more particularly the extension 11 thereof, is shown as provided at the lower end with a bottom plate 33 mounted by screws 34 and projecting marginally in such manner that the bearing members 8 and 9 cannot drop from the post should the frontal end of the tractor be raised for any purpose.

It will be noted that the spindles 10 are inclined downwardly and outwardly from the horizontal in order to camber the wheels inwardly at their lower portions, for the usual purposes.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A vehicle steering device comprising a member journaled in the vehicle for rotation about an upright axis, a pair of differentially connected guide blocks slidably mounted by separate guideways on said member for simultaneous movement in opposite directions, and ground wheels rotatably secured to the guide blocks.

2. A vehicle steering device comprising a member journaled in the vehicle, bearing members slidably mounted on the journaled member for up and down movement, ground wheels rotatably secured to the bearing members, and differential means for translating an up movement of one bearing member into a relatively down movement of the other, said differential means including a lever medially fulcrumed to the journaled member and with its ends operatively associated with the respective bearing members.

3. A vehicle steering device comprising a member journaled in the vehicle, bearing members slidably mounted on the journaled member for up and down movement, ground wheels rotatably secured to the bearing members, and differential means for translating an up movement of one bearing member into a relatively down movement of the other, said differential means including a lever medially fulcrumed to the journaled member and having anti-friction rollers at its opposite ends respectively engageable with the said bearing members.

4. A vehicle steering device comprising a member journaled in the vehicle, bearing members slidably mounted on the journaled member for up and down movement, ground wheels rotatably secured to the bearing members, and differential means for translating an up movement of one bearing member into a relatively down movement of the other, said differential means including a pulley rotatably mounted with respect to the journaled member, and a flexible element passing about the pulley and connected at its ends to the bearing members.

5. A vehicle steering device comprising a member steerable about an upright axis, wheel supported, differentially connected, bearing members arranged one at each side of the steerable member, and tongue and groove means slidably securing said bearing members to the steerable member.

6. A vehicle steering device comprising a member secured for oscillating movement about a generally upright axis, a pair of wheel supported bearing members, separate means for independently securing the bearing members to the first mentioned member in a manner permitting them to slide thereon in opposite vertical rectilinear directions, and intermeshing gear means operative to equally distribute vehicle weight to the bearing members while permitting relative vertical movements thereof.

7. In combination, a vehicle frame, a steerable member journaled therein for movement about a generally upright axis, a pair of normally axially aligned ground wheels disposed at opposite sides of the steerable member, members supportably connecting the steerable member to the wheels while permitting relative vertical movements of the wheels, and a flexible cable connecting the connecting members and movable over a bearing element in a manner operative to translate the vertical movement of one wheel into an opposite vertical movement of the other wheel.

8. In combination, a vehicle frame, a steerable mounting member journaled with respect thereto, a pair of normally axially aligned ground wheels disposed at opposite sides of the mounting member, members supportably connecting the mounting member to the wheels while permitting up and down movements of the latter, a pulley mounted on the mounting member, and a cable passing about the pulley and attached at its ends to the connecting members to reverse the up and down movements of the respective connecting members and wheels.

9. A vehicle steering device comprising a member journaled in the vehicle, bearing members slidably mounted on the journaled member for up and down movement, ground wheels rotatably secured to the bearing members, and intermeshing gear means operative to equally distribute vehicle weight to the bearing members while permitting relative movements thereof.

10. A vehicle steering device comprising a member journaled in the vehicle, bearing members slidably mounted on the journaled member for up and down movement, ground wheels rotatably secured to the bearing members, and intermeshing gear means operative to equally distribute vehicle weight to the bearing members while permitting relative movements thereof, said gear means including a pinion mounted on the journaled member, and toothed racks carried by the bearing members for meshing engagement with the pinion.

11. A vehicle steering device comprising a member secured for oscillating movement about a generally upright axis, a pair of wheel supported bearing members, separate means for independently securing the bearing members to the first mentioned member in a manner permitting them to slide thereon in opposite directions, and differential means for translating an up movement of one bearing member into a relatively down movement of the other.

12. A vehicle steering device comprising a member secured for oscillating movement about a generally upright axis, a pair of wheel supported bearing members, separate means for independently securing the bearing members to the first mentioned member in a manner permitting them to slide thereon on opposite directions, and differential means for translating an up movement of one bearing member into a relatively down movement of the other, said differential means including a turnable member mounted on the first mentioned member.

13. A vehicle steering device comprising a member secured for oscillating movement about a generally upright axis, a pair of wheel supported bearing members, separate means for independently securing the bearing members to the first mentioned member in a manner permitting them to move in opposite directions, and a lever medially fulcrumed to the first mentioned member and with its ends operatively associated with the respective bearing members to produce movements thereof in opposite directions.

14. A vehicle steering device comprising a member secured for oscillating movement about a generally upright axis, a pair of wheel supported bearing members, separate means for independently securing the bearing members to the first mentioned member in a manner permitting them to move in opposite up and down directions, and intermeshing gear means operative to equally distribute vehicle weight to the bearing members while permitting relative up and down movements thereof.

15. A vehicle steering device comprising a member secured for oscillating movement about a generally upright axis, a pair of wheel supported bearing members, separate means for independently securing the bearing members to the first mentioned member in a manner permitting them to move in opposite directions, and a flexible element passing about a guide mounted on the first mentioned member and connected at its ends to the bearing members.

ADOLPH RONNING.